Jan. 15, 1946.  W. R. FETZER  2,393,095
PROCESS OF HYDROLYSIS OF STARCH
Filed Feb. 14, 1942

INVENTOR.
Walter R. Fetzer
BY
Pineles & Green
ATTORNEYS.

UNITED STATES PATENT OFFICE 2,393,095

PROCESS OF HYDROLYSIS OF STARCH

Walter R. Fetzer, Clayton, Mo., assignor to Union Starch & Refining Company, Columbus, Ind., a corporation of Indiana Application February 14, 1942, Serial No. 430,912

6 Claims. (Cl. 127—40)

My invention relates to an improvement in the cyclic process for the production of dextrose from starch set forth in my Patent No. 2,210,659. Its object is to increase the yield of hydrolysis products, and particularly dextrose, from a given amount of starch, and to accomplish this with a minimum quantity of undesirable added products.

Specifically, the invention has as an object to produce a maximum quantity of dextrose from an acid hydrolysis of starch by the "added factor" process such as is disclosed in my Patent No. 2,210,659, but with a minimum quantity of included salts.

In my Patent No. 2,210,659, covering the acid hydrolysis of the starch, wherein dextrose is desired, data are shown which indicate that the customary starch hydrolysis as carried out in the art results in an equilibrium yield of dextrose and so-called reversion products, the latter being formed at the expense of some of the dextrose. Thus, the reducing sugars calculated as dextrose, dry substance basis, familiarly known as dextrose equivalent (D. E.) in the industry, rarely exceed 92% in commercial practice. It has been further shown in the patent referred to that a much higher yield of dextrose from the starch can be obtained by setting up anticipated conditions of equilibrium in advance through the introduction of reversion products with the starch, whereby the starch itself is hydrolyzed to substantially theoretical quantities.

The process set forth in my patent covers a cyclic return of reversion products in the manufacture of dextrose (refined corn sugar) wherein the returned reversion products with unreclaimed dextrose, familiarly known as hydrol in the industry, are mixed with starch undergoing hydrolysis.

The manufacture of refined corn sugar (dextrose) as now carried out, which the process of my Patent No. 2,210,659 is designed to improve, is substantially as follows: At an assumed concentration, 100 pounds of dry substance starch upon hydrolysis yields a sugar syrup having 107 pounds of dry substance, including 1 pound of ash, largely sodium chloride, resulting from the neutralization of the hydrochloric acid used by soda ash. This sugar syrup has a D. E. of 92. The liquor after hydrolysis is filter-pressed to remove coagulated proteins and fats, passed over bone char, concentrated, passed over additional char, and finally concentrated to the desired density for subsequent crystallization of the dextrose. Crystallization is carried out under carefully controlled conditions of temperature for several days in order to obtain the desirable crystal form for successful spinning in a centrifuge. The heavy massecuite from the crystallizer is spun in the centrifuge, whereby the dextrose is spun from the mother liquor, or hydrol. This hydrol from the first spinning, by loss of dextrose, has decreased in dextrose equivalent to 85, and increased in ash to 2%. The hydrol is then concentrated, variously retreated with refining agents, and again crystallized. From this massecuite, a second strike of dextrose is obtained, and additional mother liquor, commonly known as second hydrol. Additional strikes of dextrose may be made. In this manner, each strike of dextrose lowers the D. E. and increases the ash content. The process is continued as long as economically possible, with resultant hydrol often as low as 70 in the D. E. with ash content varying from 4% upward to as high as 8, dry substance basis.

The customary acid used in hydrolysis of starch is hydrochloric (muriatic). Hydrochloric acid is the most highly ionized of the usual mineral acids, and for this reason is more economical in acid hydrolysis. Salt produced from the neutralization of this acid by soda ash is soluble sodium chloride, common salt. Hydrochloric acid is also used in the hydrolysis of starch to produce corn syrup, the product resulting from a hydrolysis not carried as far as in the case of sugar. In corn syrup, the presence of sodium chloride is not an objection, inasmuch as it is required as a seasoning agent; for example, in the case of table syrups.

According to the process set forth in my Patent No. 2,210,659, a quantity of reversion products (either from a previous run, or synthesized) is added to the reaction of the hydrolysis, and this quantity reduces the amount of starch that is converted away from dextrose and into reversion products, by supplying such an amount of reversion products in advance. It has been determined that if the equilibrium proportion of reversion products be added, the starch will give substantially a theoretical yield of dextrose, with the same quantity of reversion products as added, left over. Likewise, if the quantity of added reversion products be less than equilibrium proportions, a reduction will be made in the quantity of starch going into reversion products, the reduction being an amount equal to the added quantity. And if an excess of reversion products be added, there will result a greater than theoretical yield of dextrose, since some of the added products revert into dextrose to establish the equilibrium.

In the cyclic process for the production of dextrose set forth above, a major difficulty has been encountered. This difficulty lies in the building up of the ash content in the hydrol to a relatively large proportion during the sequence of cycles in the process. Ash is built up because in the conventional hydrolysis employing muriatic acid with soda ash neutralization, sodium chloride (ash) is formed which is soluble in sugar liquors and not absorbed by bone char or the activated carbons. This ash is formed during each neutralization and since none is removed, it builds up in content in the solution at a rapid rate. This ash is undesirable not only because it represents a dead load that must be processed but also because such ash is corrosive and therefore damaging to the metal processing equipment.

The present application is a continuation of my copending application Serial No. 317,668 in which I disclose the use of sulphuric acid as the hydrolyzing acid in the hydrolysis of starch into dextrose in conjunction with the use of a neutralizing agent such as lime to prevent the formation and building up of a soluble ash.

It is the object of the present invention therefore to produce dextrose by a cyclic process without building up the ash content in the hydrol.

It is a further object of the present invention to maintain the hydrol at such a state of purification so that the process operates with maximum efficiency.

It is a further object of the present invention to obtain a high relative yield of dextrose from starch.

Further objects of the present invention will be apparent from a consideration of the specific description and the drawing which here follows.

Figure 1:
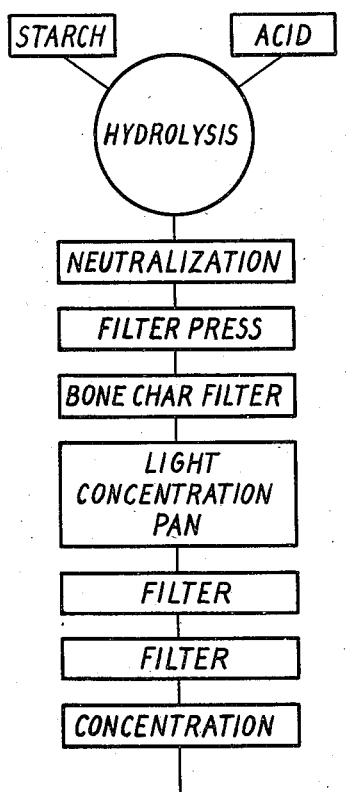
Figure 1 is a flow sheet showing diagrammatically the various steps of the process of my invention.
Figure 1:
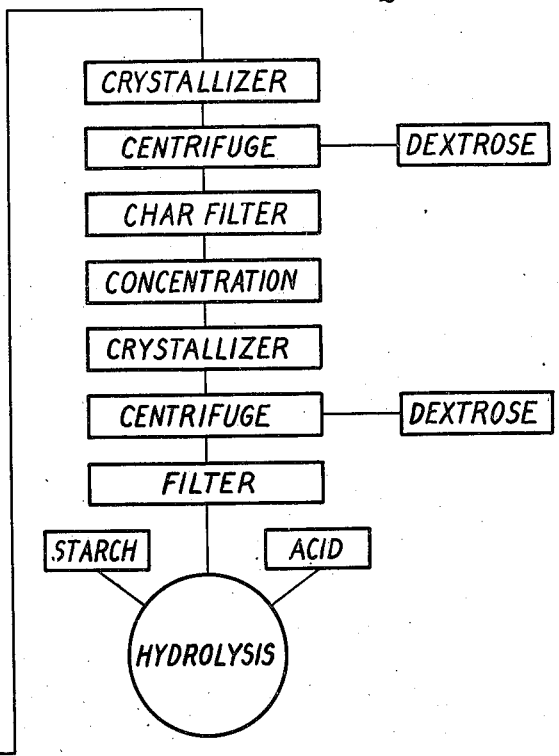

As shown in the flow sheet of Figure 1, a mix of a starch suspension of 12° Bé. and sulphuric acid in suitable proportions are introduced into the converter for hydrolysis. By the action of this sulphuric acid under heat and pressure on the starch, the starch is hydrolyzed for a sufficient time to obtain a substantial conversion of the starch to dextrose.

The acid of the hydrolysate is partially neutralized by a slurry of lime to a pH of approximately 5, the reaction of the sulphuric acid and lime forming gypsum. This neutralization results in the coagulation of substantial quantities of protein and fat contained in the hydrolysate. The entire hydrolysate then passes through two filter presses which remove the coagulated fat and protein.

The hydrolysate is then passed over bone char filters which absorb and remove substantial quantities of the gypsum (calcium sulphate) formed in the neutralization.

This liquor then passes to a light concentration pan which concentrates the hydrolysate to 28–30° Bé. The resulting sugar liquor from this concentration pan passes over two char filters in series which further reduce the amount of residual color and calcium sulphate still remaining in the liquor.

The sugar liquor then passes to a concentrating pan which concentrates to approximately 40° Bé., whereupon the liquor is transferred to a crystallizer which, after a suitable time, develops a magma or massecuite containing dextrose crystals. During this crystallization of dextrose the density of the mother liquor decreases and any residual calcium sulphate which tends to crystallize out is redissolved because of the reduced density of this mother liquor.

The magma or massecuite containing, for example, 100 lbs. D. S. 91 D. E. corn sugar, then passes to a centrifuge which removes approximately 53 lbs. of the dextrose. The mother liquor containing residual dextrose and reversion products is passed over char filters to remove further color and gypsum, after which it is reconcentrated to 40° Bé. for a second crystallization to remove further dextrose. The magma of the second crystallizer now containing 47.4 lbs. D. S. 81 D. E. corn sugar is passed to a centrifuge which removes approximately 17 lbs. of dextrose. The mother liquor or hydrol remaining is then used with fresh starch for a new conversion.

The proportions of the new charge for conversion for full equilibrium proportions are substantially 60% dry substance hydrol, and 40% dry substance starch. To such a starch-hydrol mix is added sufficient sulphuric acid for conversion, the conversion being conducted under similar conditions of pressure and temperature as used in the first conversion. The process of the first cycle described hereinbefore is repeated.

Decolorizing carbons vary in their effectiveness in color removal, organic impurity removal and mineral impurity removal. For example, the so-called vegetable carbons as produced today have very little absorption for mineral matter. On the contrary, bone char is very effective in ash absorption. However, the effectiveness of bone char as an agent for the removal of mineral matter is dependent on the character of the same. For example, sodium chloride is little, if any, removed from sugar solutions by bone char and this is the reason for the accumulation of sodium chloride in the conventional process for the production of dextrose. However, sulphates are very effectively absorbed by bone char.

In the process described above, the sugar liquor and the bone char filter move countercurrently. This means that the most purified liquor is passed through fresh char and after a suitable interval in which the char becomes saturated with respect to impurities, both mineral and organic, the filter is moved to a liquor containing greater amounts of these impurities for which it has additional absorption capacity. The purified liquor in turn is passed through a new char filter introduced into the refining system. Thus char filters by three successive stages absorb calcium sulphate at three increasing absorption levels, thus effectively removing a substantial part of the calcium sulphate.

However, despite the fact that a good proportion of the ash or calcium sulphate is absorbed a certain percentage still remains and will tend to crystallize out when the dextrose comes out. When the sugar liquor is introduced into the crystallizer, it generally is left in the crystallizer for two or three days for the first crystallization of the dextrose and the gypsum tends to crystallize out with the dextrose. However, when crystallization does occur the gypsum crystals will tend to redissolve as the mother liquor decreases in density upon the discharge of the dextrose therefrom. This is a peculiar function of the particular combination of sugar liquor, dextrose and gypsum and is due to the fact that the solubility of the gypsum in sugar solutions materially increases upon the lowering of the concentration of the sugar liquor and conversely, the solubility of the gypsum in the sugar liquor decreases as the concentration of the sugar liquor rises.

Figure 2:
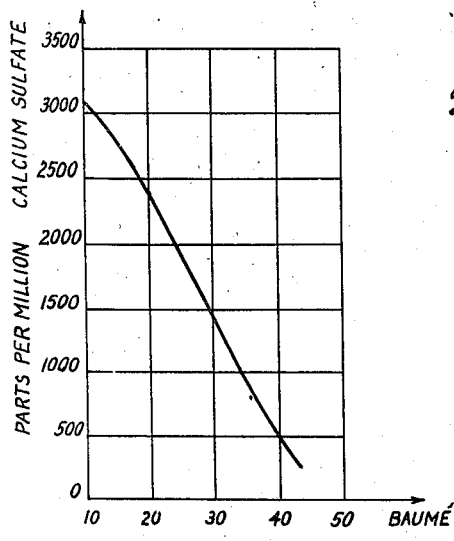
Figure 2 is a chart showing the solubility of gypsum (calcium sulphate) in the starch hydrolysate.

The solubility curve, as will be noted from Figure 2, is quite sharp. This peculiar phenomenon is of great significance in this particular process since it results in a high degree of gypsum free dextrose precipitation. That is, the small amount of gypsum which may not be removed by filter or char does not contaminate the dextrose but is thrown back in the solution of the mother liquor upon the separation of the dextrose from the mother liquor.

From the above wherein bone char is used to absorb the calcium sulphate, it might appear that the bone char would become saturated with calcium sulphate and its utility diminished. This is true and the char is therefore revivified. In the refining of dextrose and corn syrup, the char is treated differently than in the customary sucrose refining process. The refining of dextrose is carried out on the acid side usually in the pH range of 4 to 5.5. For this reason the char is operating on the acid side contrary to the refining of cane sugar and in order to effect an acid char after revivification, the char is washed with a dilute solution of hydrochloric acid, approximately .3% which effectively removes any residual calcium sulphate and that which has been changed to calcium sulphide in the revivification process. Thus the char for a fresh cycle is denuded of the calcium sulphate and presents a virgin surface for gypsum absorption for a section cycle.

The use of sulphuric acid as a hydrolyzing agent is not standard practice in the wet milling industry which produces both corn syrup and dextrose. The reason for this is that the usual refinery produces both corn syrup and dextrose and even with the use of muriatic acid as a hydrolyzing agent, the formation of gypsum crystals in the corn syrup has always been a serious problem. The solubility of gypsum in corn syrup is extremely limited and when the solubility of gypsum in corn syrup is exceeded by as little as 300 parts per million, the formation of gypsum crystals gives an objectionable milky appearance to the corn syrup. This results from the fact that in the production of corn syrup all of the mineral impurities appear in the finished syrup. Since most refineries produce both corn syrup and dextrose, the standard practice has been to employ muriatic acid so that there is no contamination from the standpoint of gypsum in such refineries.

However, I have found it desirable, contrary to common practice, to use sulphuric acid as the hydrolyzing agent in the present process for the cyclic production of dextrose because of two unusual properties of the gypsum formed; first, because of the selective absorption of the gypsum by the decolorizing carbons used and, second, because of the peculiar solubility characteristics of gypsum in the sugar liquor as shown by Figure 2, which results in a substantial gypsum free dextrose yield.

The reactions of the lime and sulphuric acid produce the insoluble salt calcium sulphate which can then be removed as indicated. Other acids or neutralizing agents can be employed so long as they are so selected to produce an insoluble salt by reaction.

Various modifications of my invention will suggest themselves to those skilled in the art. I accordingly desire that in construing the breadth of the appended claims they shall not be limited to the specific details shown and described in connection with the above explanation.

I claim:

1. The process of producing dextrose which comprises adding sulphuric acid to a starch suspension; hydrolyzing this mix of sulphuric acid and starch under heat and pressure to form a hydrolysate containing dextrose; neutralizing the sulphuric acid of the hydrolysate with lime, said lime reacting with said sulphuric acid to form gypsum; filtering the neutralized hydrolysate; removing said gypsum from said hydrolysate by bone char; separating a substantial portion of the dextrose out from said hydrolysate leaving a mix containing reversion products, passing said mix over bone char filters, said reversion products being thereby rendered substantially free from gypsum; and adding said substantially gypsum free reversion products to a new starch suspension for hydrolysis thereof.

2. The process of producing dextrose which comprises adding sulphuric acid to a starch suspension; hydrolyzing this mix of sulphuric acid and starch under heat and pressure to form a hydrolysate containing dextrose; neutralizing the sulphuric acid of the hydrolysate with lime, said lime reacting with said sulphuric acid to form gypsum; filtering the neutralized hydrolysate; removing said gypsum from said hydrolysate by bone char; concentrating said hydrolysate; crystallizing the dextrose in said hydrolysate; separating a substantial portion of the dextrose out from said hydrolysate leaving a mix containing reversion products, passing said mix over bone char filters, said reversion products being thereby rendered substantially free from gypsum; and adding said substantially gypsum free reversion products to a new starch suspension for hydrolysis thereof.

3. A process of producing dextrose which comprises adding sulphuric acid to a starch suspension; hydrolyzing this mix of sulphuric acid and starch under heat and pressure to form a hydrolysate containing dextrose; neutralizing the sulphuric acid of the hydrolysate with an alkali, said alkali reacting with said sulphuric acid to form an insoluble sulphate salt; filtering the neutralized hydrolysate; removing said insoluble sulphate salt from said hydrolysate with bone char; concentrating said hydrolysate; crystallizing the dextrose in said hydrolysate; separating a substantial portion of the dextrose out from said hydrolysate leaving a mix containing reversion products and residual dextrose, passing said mix over bone char to render such reversion products substantially free from said insoluble sulphate salt; and adding said substantially sulphate salt free reversion products to a new starch suspension for hydrolysis thereof.

4. The process of producing dextrose which comprises adding sulphuric acid to a starch suspension; hydrolyzing this mix of sulphuric acid and starch under heat and pressure to form a hydrolysate containing dextrose; neutralizing the sulphuric acid of the hydrolysate with lime, said lime reacting with said sulphuric acid to form gypsum; filtering the neutralized hydrolysate; removing said gypsum from said hydrolysate by bone char; concentrating said hydrolysate; crystallizing the dextrose in said hydrolysate; separating a substantial portion of the dextrose out from said hydrolysate leaving a mix containing reversion products; again removing gypsum by bone char to render the reversion products substantially gypsum free; and adding said substantially gypsum free reversion products to a new starch suspension for hydrolysis thereof.

5. The process of producing dextrose which comprises adding sulphuric acid to a starch suspension; hydrolyzing this mix of sulphuric acid and starch under heat and pressure to form a hydrolysate containing dextrose; neutralizing the sulphuric acid of the hydrolysate with lime, said lime reacting with said sulphuric acid to form gypsum; filtering the neutralized hydrolysate, removing said gypsum from said hydrolysate by bone char; concentrating said hydrolysate; removing more gypsum from said concentrated hydrolysate with bone char; crystallizing the dextrose in said hydrolysate; separating a substantial portion of the dextrose out from said hydrolysate leaving a mix containing reversion products; again removing gypsum to render the reversion products substantially gypsum free; and adding said substantially gypsum free reversion products to a new starch suspension for hydrolysis thereof.

6. The process of producing dextrose which comprises adding sulphuric acid to a starch suspension; hydrolyzing this mix of sulphuric acid and starch under heat and pressure to form a hydrolysate containing dextrose; neutralizing the sulphuric acid of the hydrolysate with lime, said lime reacting with said sulphuric acid to form gypsum; filtering the neutralized hydrolysate; removing said gypsum from said hydrolysate by bone char; concentrating said hydrolysate; removing more gypsum from said concentrated hydrolysate with bone char; again concentrating said hydrolysate; crystallizing the dextrose in said hydrolysate; separating a substantial portion of the dextrose out from said hydrolysate leaving a mix containing reversion products; again removing gypsum to render the reversion products substantially gypsum free; and adding said substantially gypsum free reversion products to a new starch suspension for hydrolysis thereof.

WALTER R. FETZER.